(12) United States Patent
Lee et al.

(10) Patent No.: US 10,979,625 B2
(45) Date of Patent: Apr. 13, 2021

(54) METHOD FOR EDITING IMAGE BASED ON ARTIFICIAL INTELLIGENT AND ARTIFICIAL DEVICE

(71) Applicant: LG ELECTRONICS INC., Seoul (KR)

(72) Inventors: Kyuho Lee, Seoul (KR); Jaewoong Jeong, Seoul (KR); Seunghyun Hwang, Seoul (KR); Youngman Kim, Seoul (KR); Sangjun Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/584,480

(22) Filed: Sep. 26, 2019

(65) Prior Publication Data
US 2020/0092465 A1    Mar. 19, 2020

(30) Foreign Application Priority Data
Aug. 26, 2019  (KR) .................. 10-2019-0104376

(51) Int. Cl.
*H04N 5/232* (2006.01)
*G06N 3/08* (2006.01)
*G06K 9/62* (2006.01)

(52) U.S. Cl.
CPC ....... *H04N 5/23222* (2013.01); *G06K 9/6256* (2013.01); *G06N 3/08* (2013.01); *H04N 5/23218* (2018.08); *H04N 5/232127* (2018.08); *H04N 5/232935* (2018.08); *H04N 5/232939* (2018.08)

(58) Field of Classification Search
CPC ......... H04N 5/23222; H04N 5/232939; H04N 5/232127; H04N 5/232935; H04N 5/23218; G06N 3/08; G06K 9/6256
See application file for complete search history.

(56) References Cited

U.S. PATENT DOCUMENTS 10,147,216 B1 * 12/2018 Miao ................. G06T 7/194
2011/0157221 A1 *  6/2011 Ptucha ................ H04N 7/183
345/629

FOREIGN PATENT DOCUMENTS

KR    10-2019-0064958 A    6/2019
KR    10-2019-0078543 A    7/2019

* cited by examiner

*Primary Examiner* — Ahmed A Berhan
(74) *Attorney, Agent, or Firm* — Birch, Stewart, Kolasch & Birch LLP

(57) ABSTRACT

A method for editing an image based on artificial intelligence and an artificial intelligence device are disclosed. In the method for editing an image based on artificial intelligence, a recommended photographic composition is created by applying an image acquired by a camera to a pre-trained composition recommendation model, and the image is corrected based on the created recommended photographic composition, whereby it is possible to capture and edit an image at the same time without the trouble of correcting the image after capturing it. One or more of an artificial intelligence device of the present disclosure can be associated with artificial intelligence modules, drones (unmanned aerial vehicles (UAVs)), robots, augmented reality (AR) devices, virtual reality (VR) devices, devices related to 5G service, etc.

16 Claims, 18 Drawing Sheets

[Figure 1]
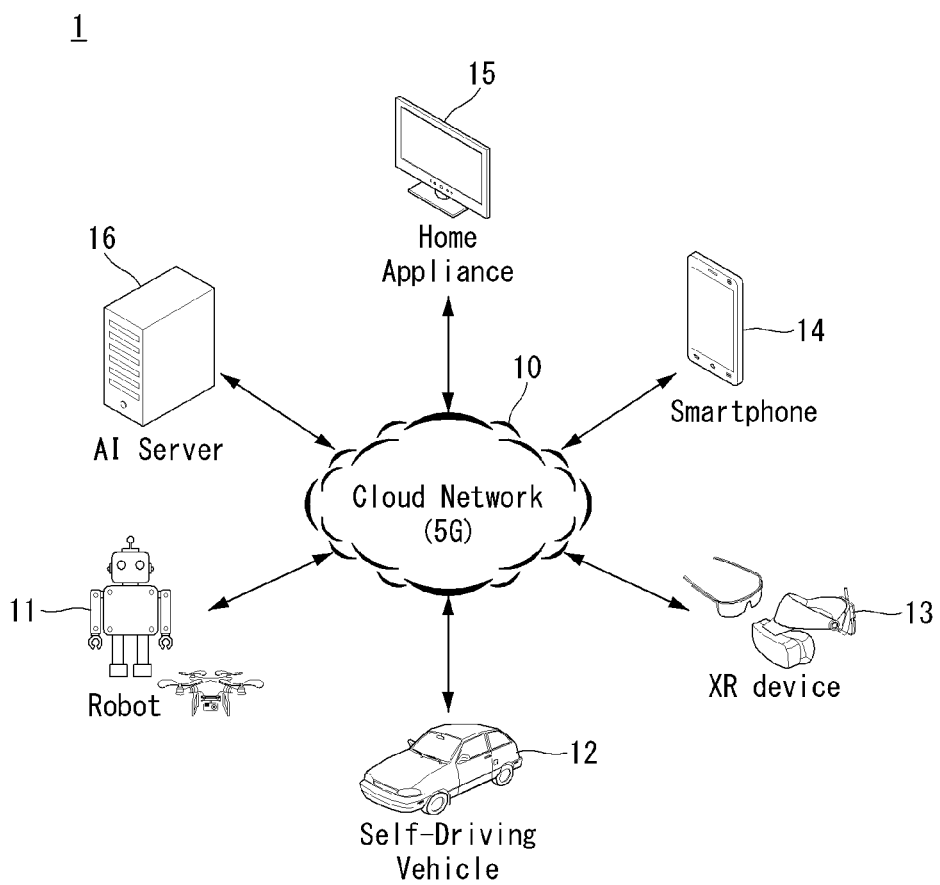

[Figure 2]
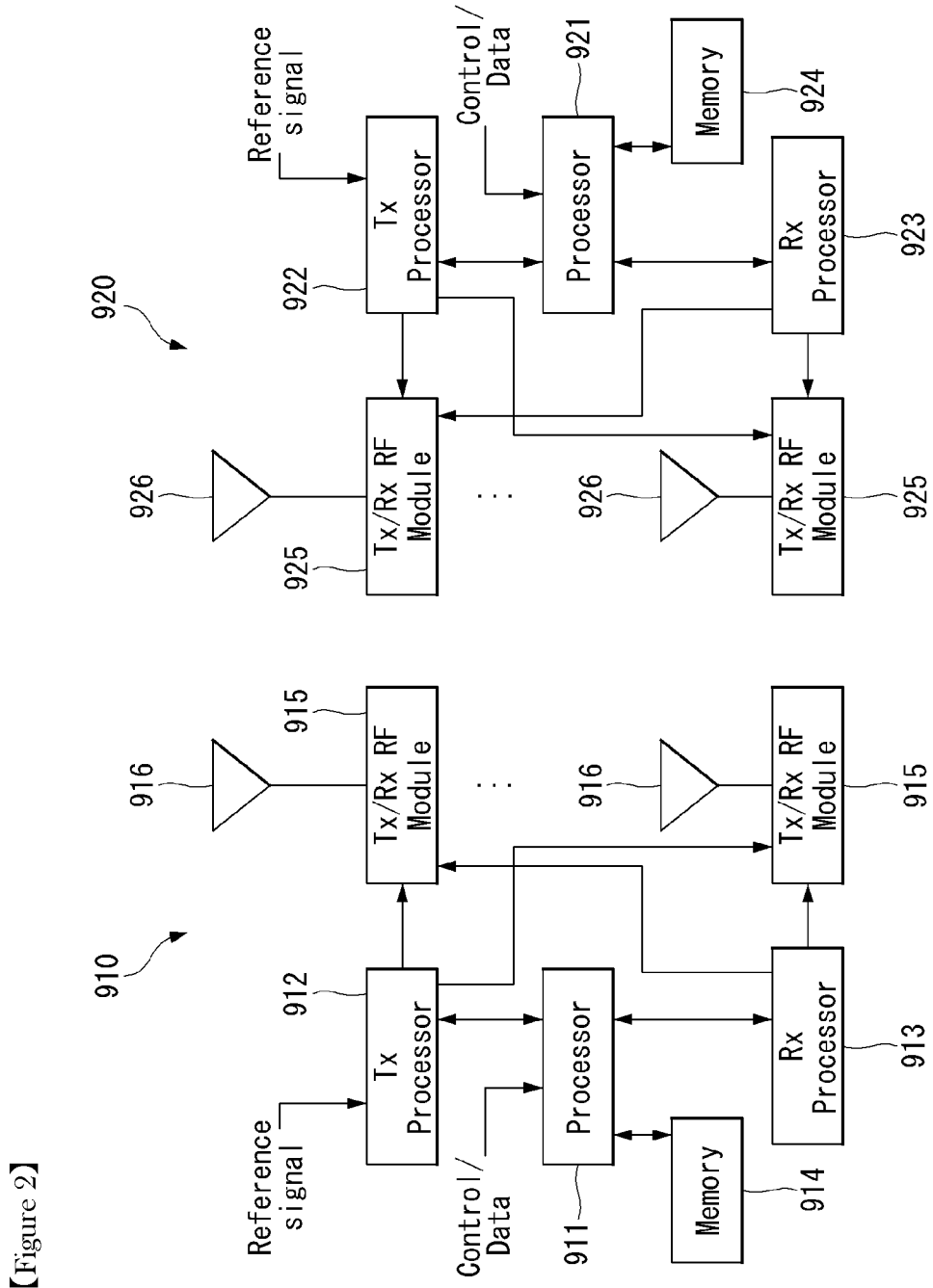

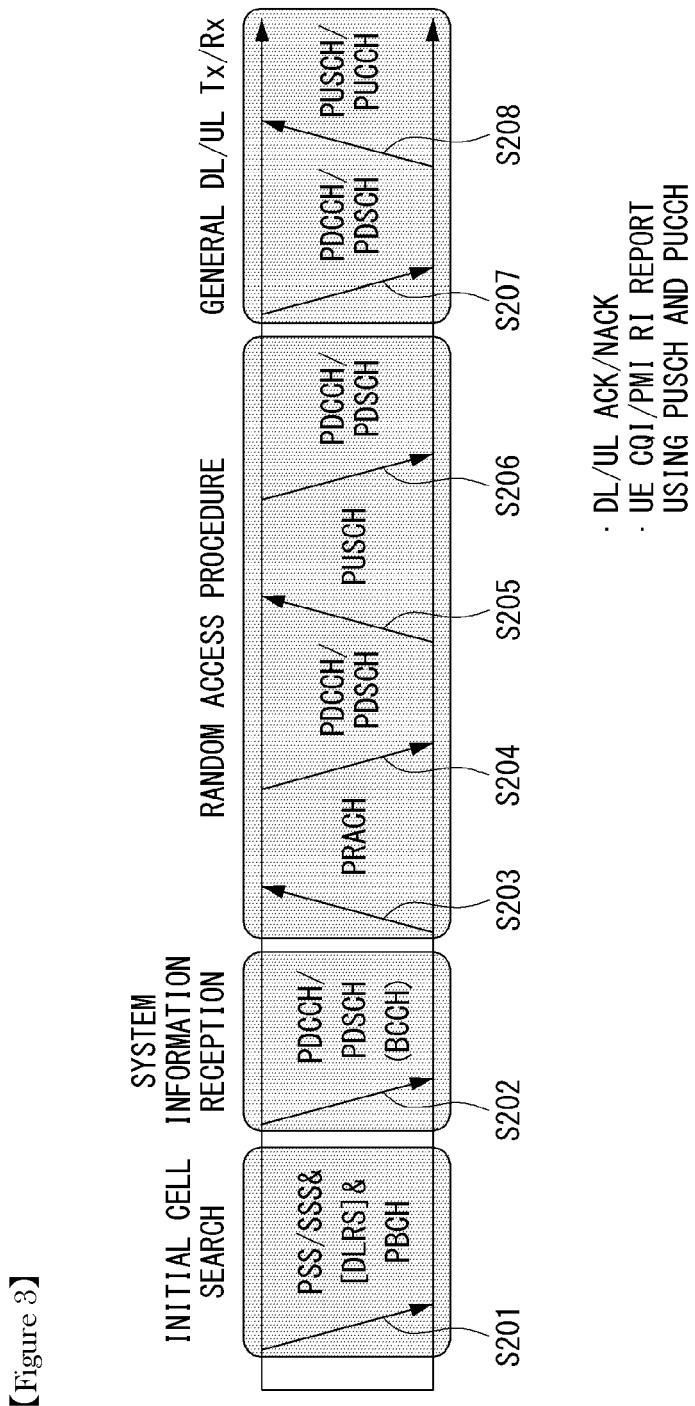
[Figure 3]

[Figure 4]
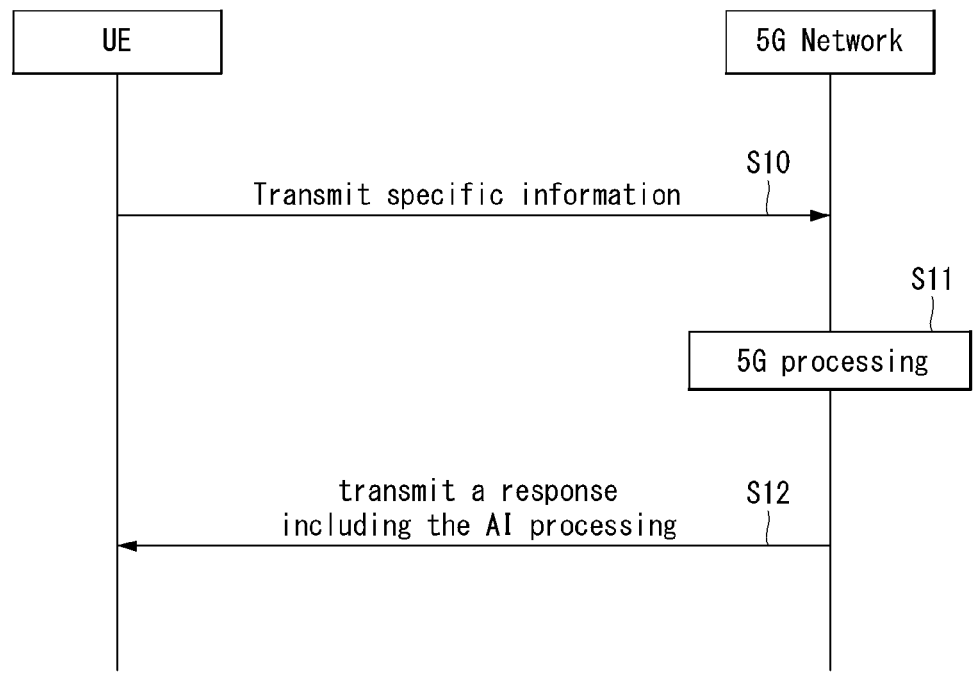

【Figure 5】
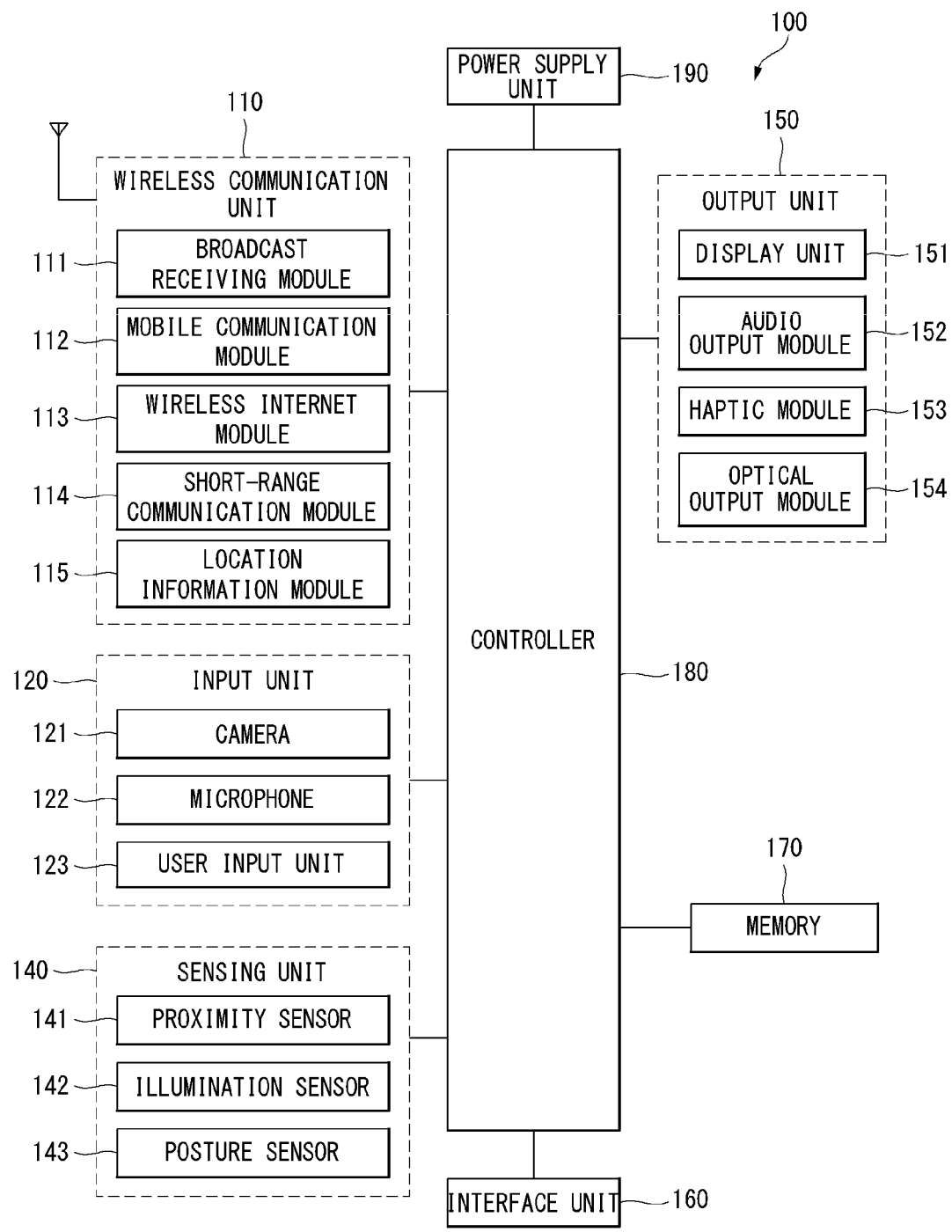

[Figure 6]
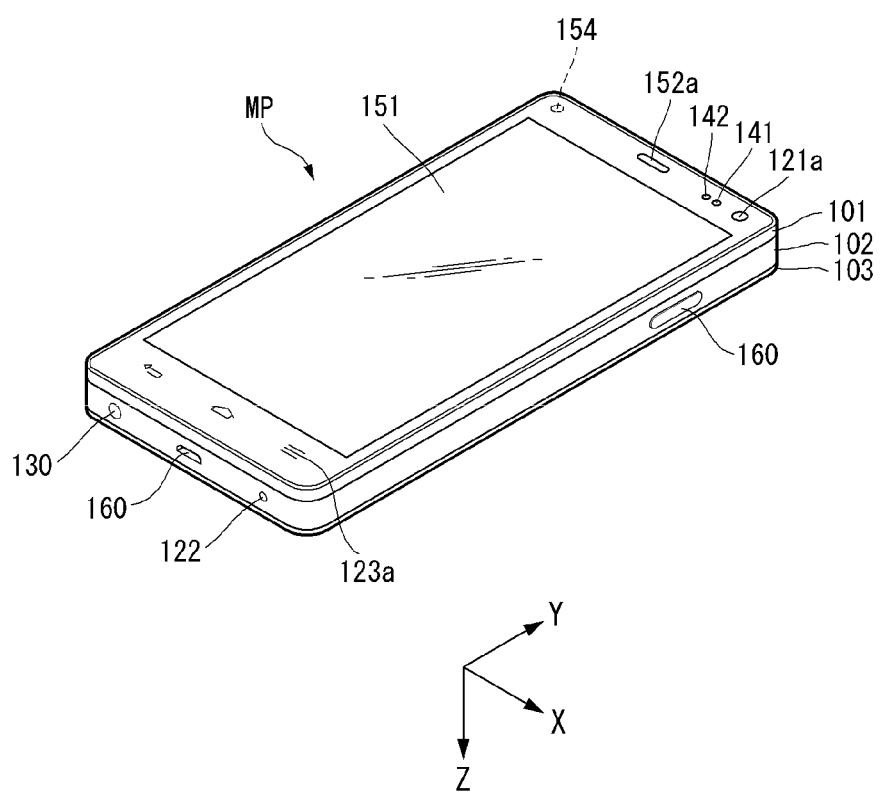

[Figure 7]
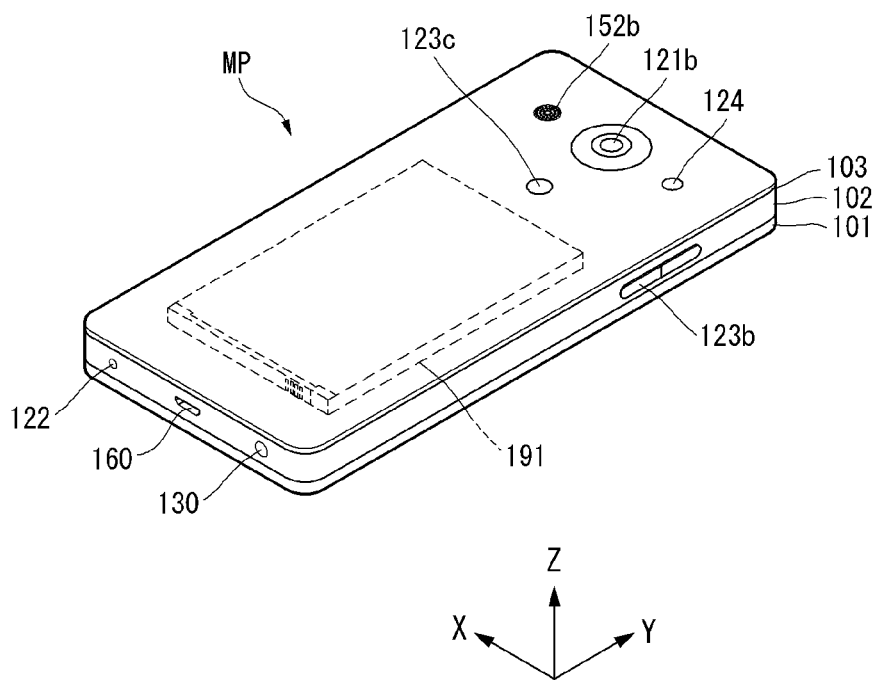

[Figure 8]
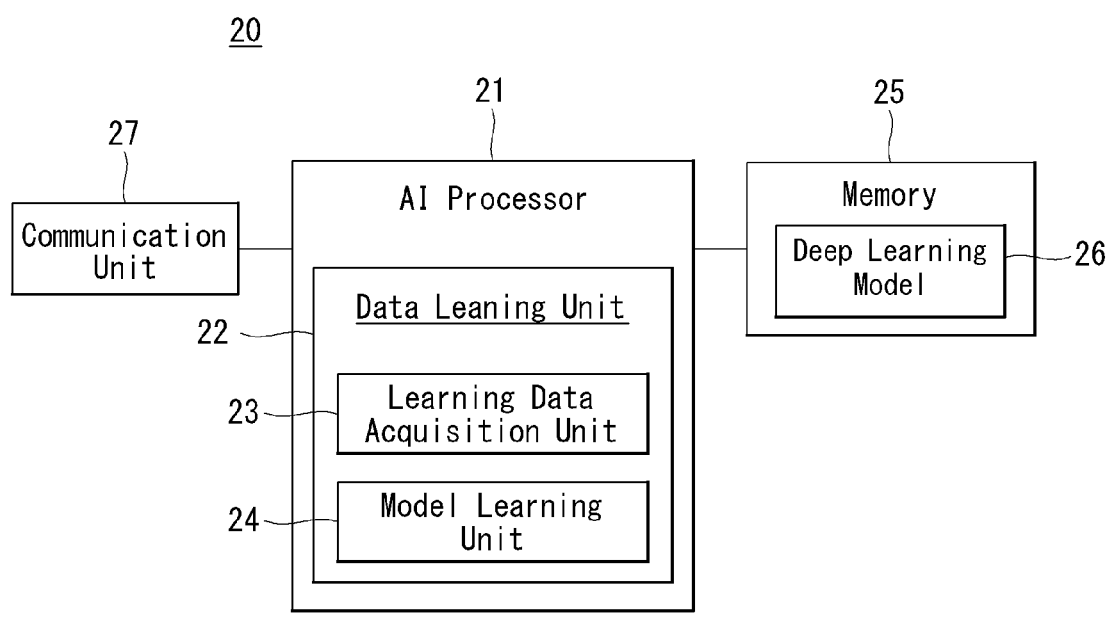

【Figure 9】
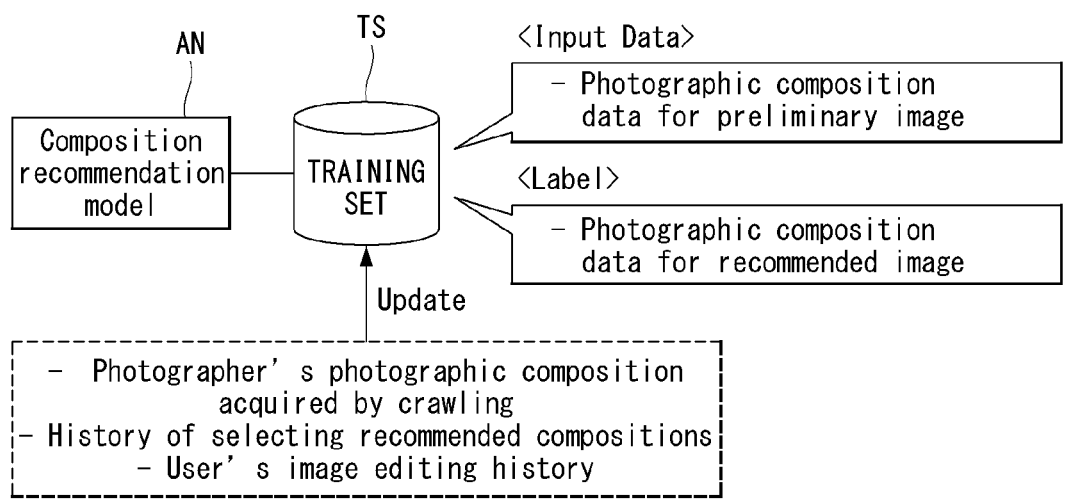

[Figure 10]
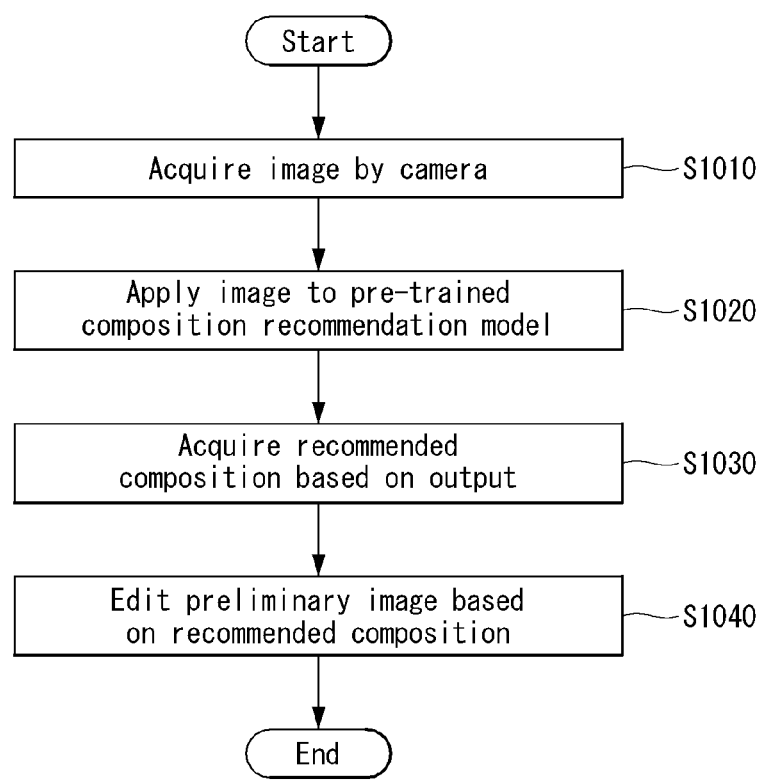

[Figure 11]
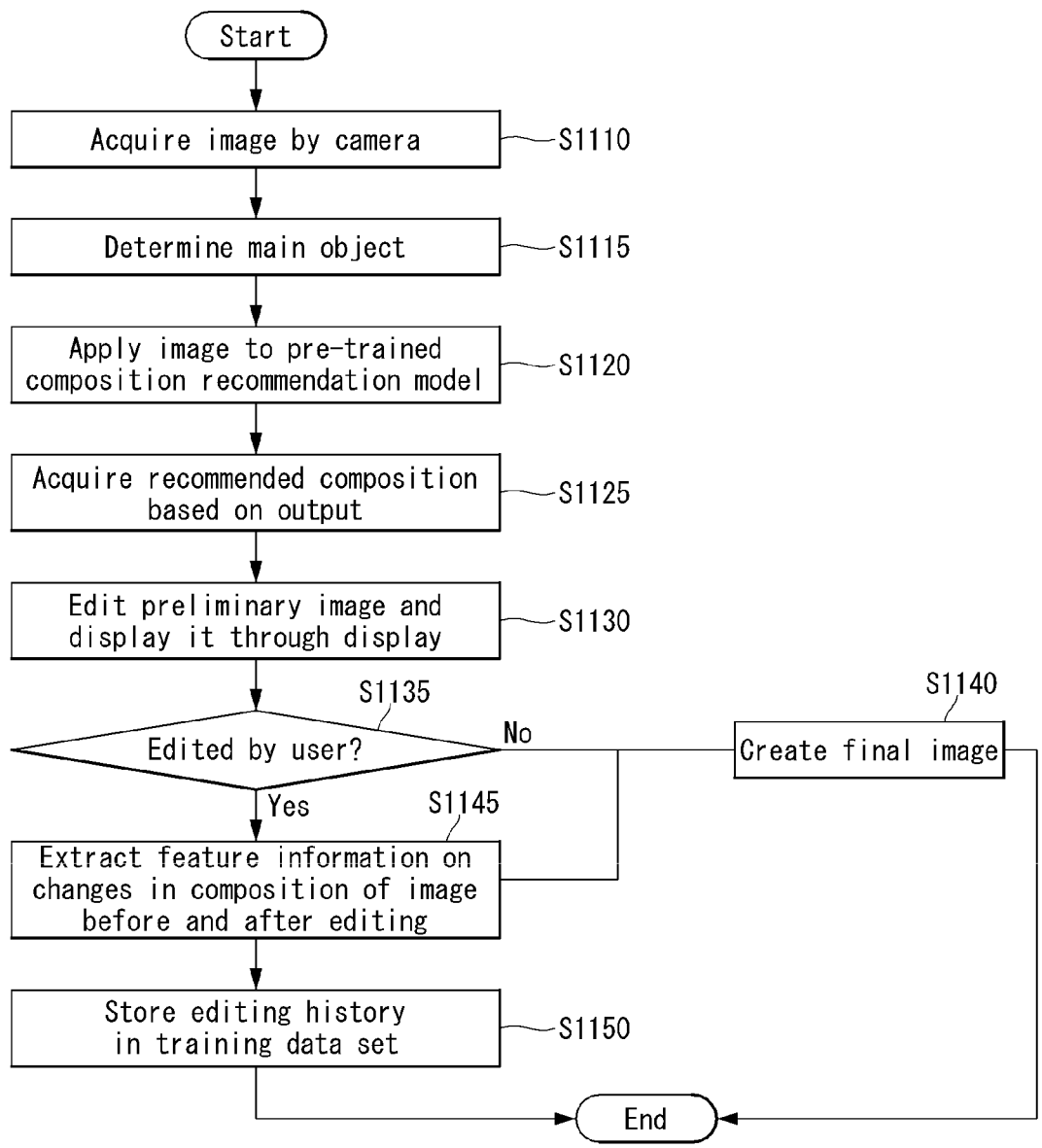

[Figure 12]
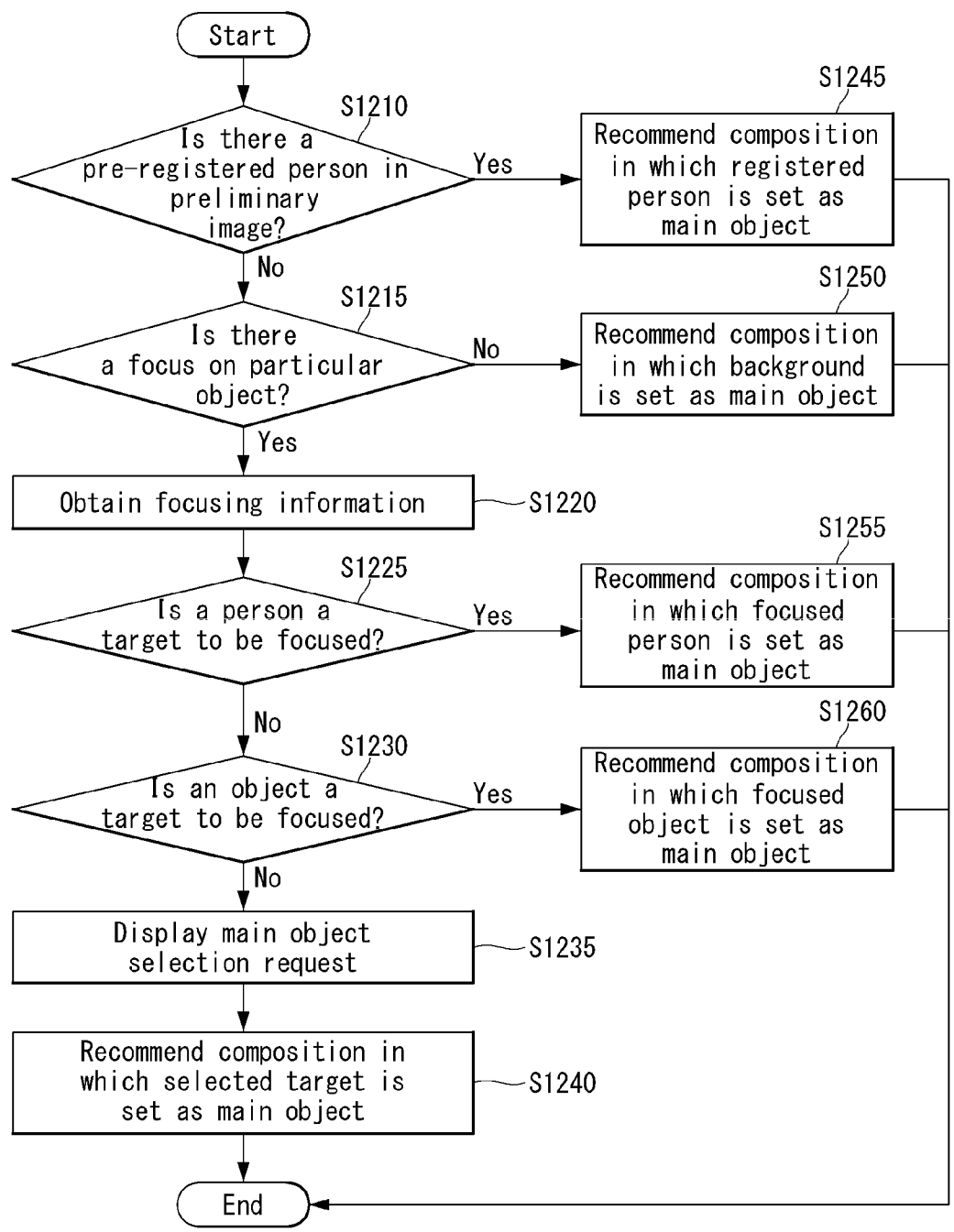

【Figure 13】
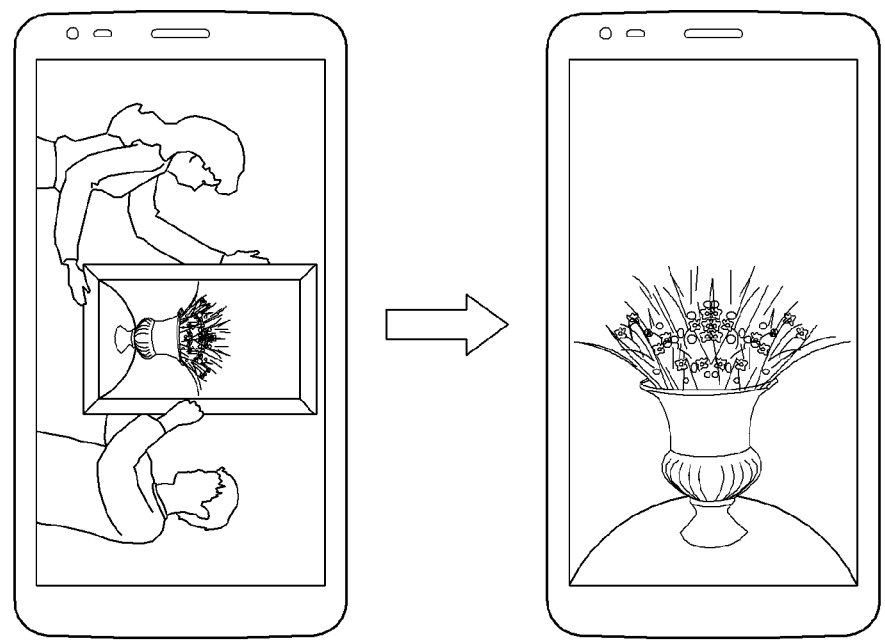

[Figure 14]
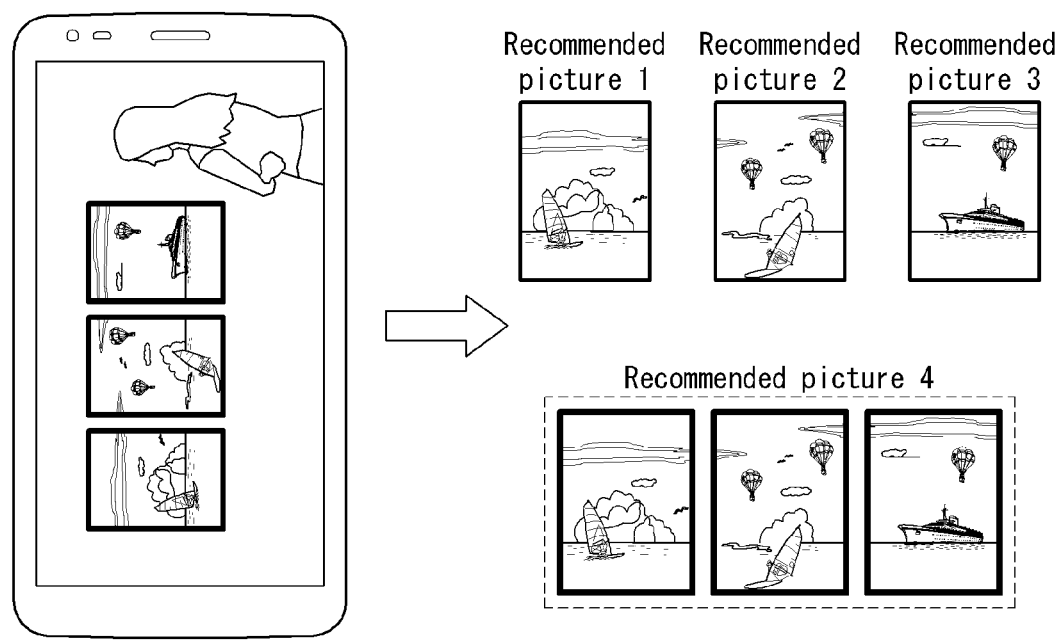

[Figure 15]
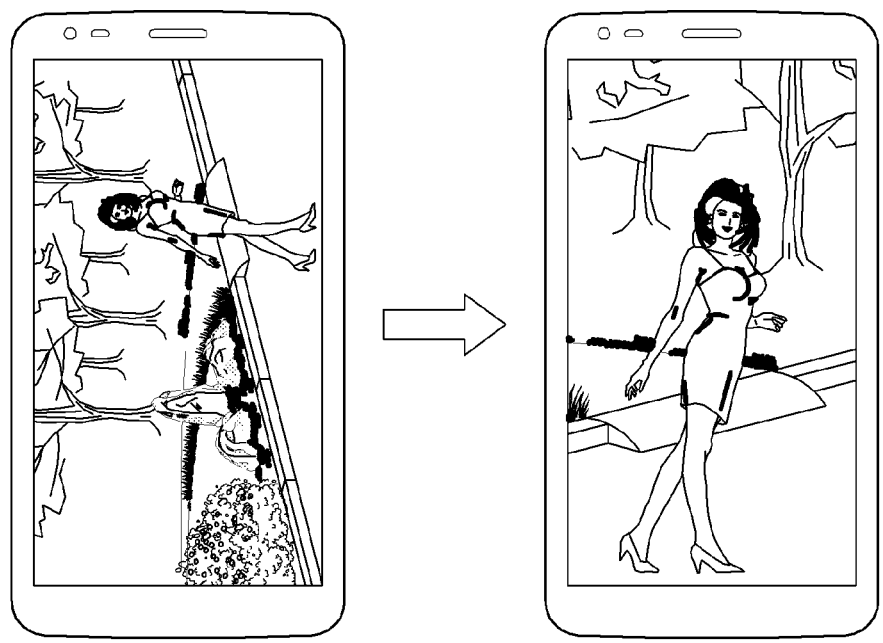

[Figure 16]
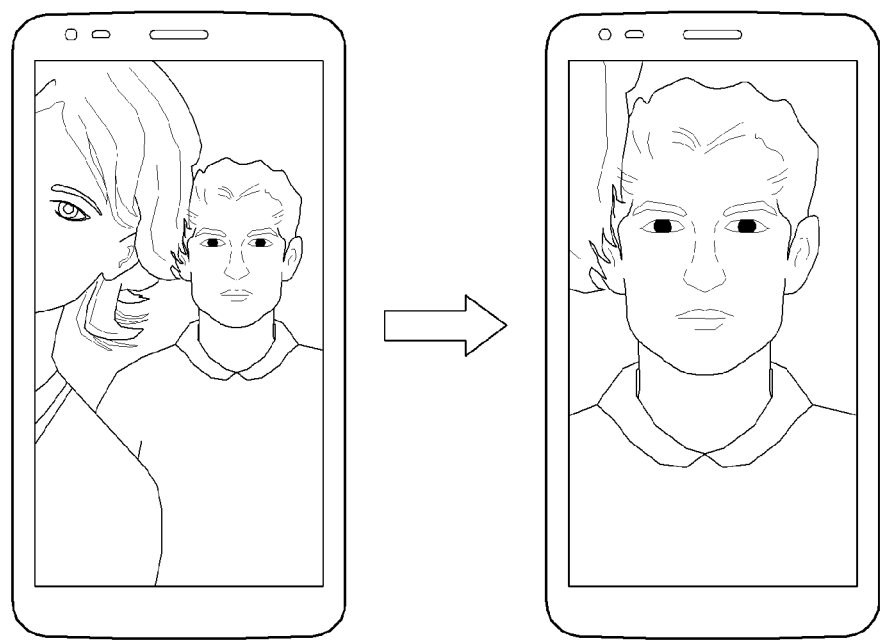

【Figure 17】
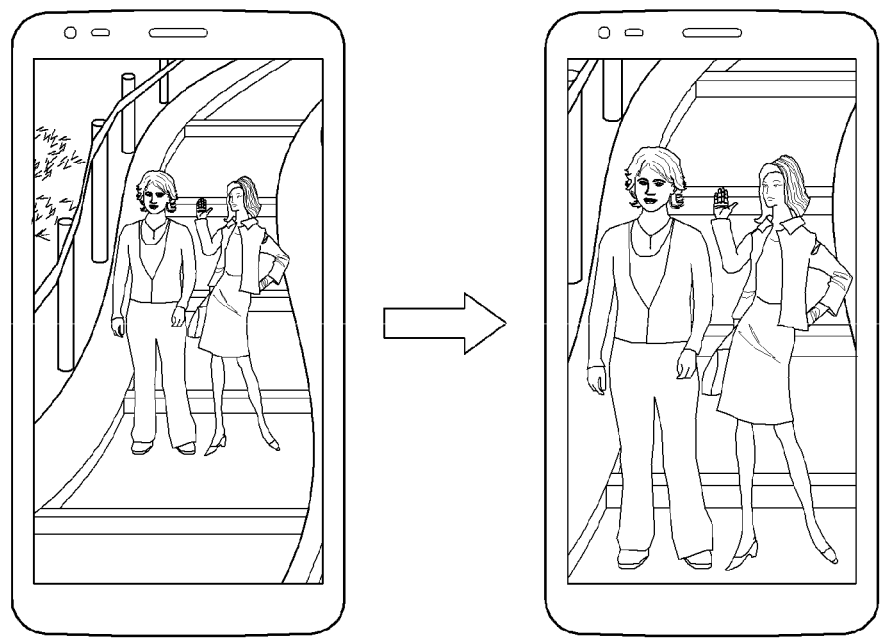

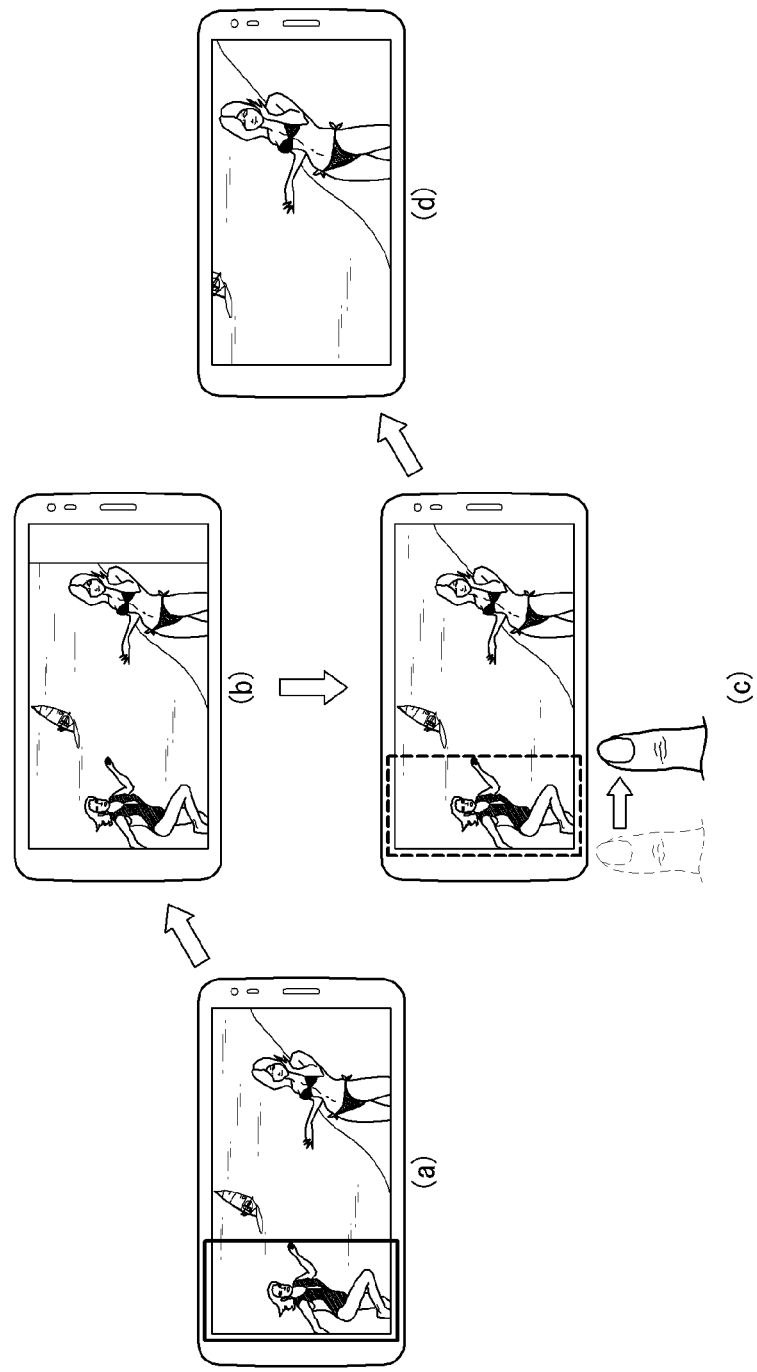
[Figure 18]

METHOD FOR EDITING IMAGE BASED ON ARTIFICIAL INTELLIGENT AND ARTIFICIAL DEVICE

CROSS-REFERENCE TO RELATED APPLICATION

This application claims the benefit of Korean Patent Application No. 10-2019-0104376 filed on Aug. 26, 2019, the entire contents of which is incorporated herein by reference for all purposes as if fully set forth herein.

BACKGROUND OF THE INVENTION

Field of the Invention

The present disclosure relates to a method for editing an image based on artificial intelligence and an artificial intelligence device and, more particularly, to a method for editing an image based on artificial intelligence and an artificial intelligence device which are capable of recommending a photographic composition for objects to be shot.

Related Art

An artificial intelligence (AI) system is a computer system that achieve human-level intelligence, which, unlike existing rule-based smart systems, makes machines smart enough to learn and decide on their own. The more the artificial intelligence system is used, the higher its recognition rate and the better it understands a user's preferences. Hence, the existing rule-based smart systems are being gradually replaced by deep learning-based artificial intelligence systems.

Artificial intelligence technologies include machine learning and element technologies using machine learning.

Machine learning is an algorithm that classifies and learns features from input data on their own, whereas the element technologies are technologies that mimic human brain functions such as perception, decision making, etc. using machine learning algorithms such as deep learning, which include a number of technical fields, including language understanding, visual understanding, reasoning/prediction making, knowledge representation, motion control, etc.

Artificial intelligence technology can be applied to the following various subfields. Language understanding is concerned with recognizing, applying, and processing human language/text, which includes natural language processing, machine translation, question answering, speech recognition/synthesis. Visual understanding is concerned with recognizing and processing objects just as human vision does, which includes object recognition, object tracking, image retrieval, human recognition, scene understanding, spatial understanding, image enhancement, etc. Reasoning/prediction making is concerned with understanding information and making logical inferences and predictions, which includes knowledge/probability-based reasoning, optimal prediction, preference-based planning, recommendation, etc. Knowledge representation is concerned with the automated transformation of human experiences into knowledge data, which includes knowledge building (data creation/classification), knowledge management (application of data), etc. Motion control is concerned with controlling the driving of self-driving vehicles and the movement of robots, which includes movement control (navigation, collision, and driving), manipulation control (behavior control), etc.

As the number of camera modules on a smartphone has increased recently, it becomes easier to take pictures simultaneously at more various angles, as compared to existing smartphones. However, there still remains the problem that most of the people who have not acquired knowledge of photography have difficulties with setting up a composition.

SUMMARY OF THE INVENTION

An aspect of the present disclosure is to solve the above-described needs and/or problems.

Another aspect of the present disclosure is to implement a method for editing an image based on artificial intelligence and an artificial intelligence device which are capable of recommending a professional photographer' composition.

Another aspect of the present disclosure is to implement a method for editing an image based on artificial intelligence and an artificial intelligence device which are capable of editing a captured image based on a recommended photographic composition.

Another aspect of the present disclosure is to implement a method for editing an image based on artificial intelligence and an artificial intelligence device which are capable of capturing and editing an image at the same time without the trouble of correcting the image after capturing it.

Another aspect of the present disclosure is to implement a method for editing an image based on artificial intelligence and an artificial intelligence device which are capable of determining whether an individual prefers a photographic composition or not and learning a personal editing pattern.

An exemplary embodiment of the present disclosure provides a method for editing an image based on artificial intelligence, the method comprising: acquiring a preliminary image by a camera; applying the preliminary image to a pre-trained composition recommendation model; creating a recommended photographic composition based on an output from the composition recommendation model; and correcting the preliminary image based on the recommended photographic composition, wherein the composition recommendation model is an artificial neural network model that is trained by setting up first photographic composition data and second photographic composition data as a training data set, wherein the first photographic composition data being extracted from the preliminary image, and the second photographic composition data being extracted from the recommended image.

Furthermore, the recommended image may be a professional photographer's photographic image.

Furthermore, the method may further comprise training the composition recommendation model.

Furthermore, the method of claim may further comprise: obtaining the user's history of selecting recommended images and the user's image editing history; updating the training data set based on the user's history of selecting recommended images and the user's image editing history; and training the composition recommendation model based on the updated training data set.

Furthermore, the method may further comprise: identifying objects included in the preliminary image; and obtaining photographic composition data based on the positions of the identified objects.

Furthermore, the photographic composition data may comprise at least one among the types of objects, the number of objects, and a main object.

Furthermore, the method may further comprise determining the main object.

Furthermore, the determining of the main object may comprise identifying a person pre-registered on an artificial intelligence device, wherein, if the pre-registered person exists, the pre-registered person may be set as the main object.

Furthermore, the determining of the main object may comprise determining the main object based on the proportion of each of a plurality of objects included in the preliminary image.

Furthermore, the determining of the main object may comprise determining the main object based on the camera's focusing information.

Furthermore, the method may further comprise, if there is at least one recommended image, displaying the recommended image on a display.

Furthermore, the applying of the preliminary image to a pre-trained composition recommendation model may further comprise sending the preliminary image to an external server connected to the artificial intelligence device to apply the same to a composition recommendation model stored in the external server, and receiving a recommended photographic composition created based on an output from the composition recommendation model stored in the external server.

Another exemplary embodiment of the present disclosure provides an artificial intelligence device comprising: a memory that stores a trained composition recommendation model and a training data set for the composition recommendation model; a transceiver that communicates with an external server; a camera that captures a preliminary image; and a processor that applies the preliminary image to the composition recommendation model, creates a recommended photographic composition based on an output from the composition recommendation model, and corrects the preliminary image based on the recommended photographic composition.

A method for editing an image based on artificial intelligence and an artificial intelligence device according to an exemplary embodiment of the present disclosure have the following advantageous effects.

The present disclosure has the advantage of recommending a professional photographer' composition.

Another advantage of the present disclosure is to edit a captured image based on a recommended photographic composition.

A still another advantage of the present disclosure is to capture and edit an image at the same time without the trouble of correcting the image after capturing it.

A further advantage of the present disclosure is to determine whether an individual prefers a photographic composition or not and learn a personal editing pattern.

It is to be understood that the advantages that can be obtained by the present disclosure are not limited to the aforementioned advantages and other advantages which are not mentioned will be apparent from the following description to the person with an ordinary skill in the art to which the present disclosure pertains.

BRIEF DESCRIPTION OF THE DRAWINGS

In order to help understanding of the present disclosure, the accompanying drawings which are included as a part of the detailed description provide embodiments of the present disclosure and describe the technical features of the present disclosure together with the detailed description.

FIG. 1 is a conceptual diagram of an example of an AI device.

FIG. 2 illustrates a block diagram of a wireless communication system to which methods proposed in this specification are applicable.

FIG. 3 is a view showing an example of a signal transmission/reception method in a wireless communication system.

FIG. 4 shows an example of how a user terminal and 4G network basically work in a 5G communication system.

FIG. 5 is a block diagram for explaining a mobile terminal related to the present disclosure.

FIGS. 6 and 7 are conceptual diagrams of an example of a mobile terminal related to the present disclosure when viewed from different directions.

FIG. 8 is a is a block diagram of an AI device according to an embodiment of the present disclosure.

FIG. 9 is a view showing a training data set for a pre-trained artificial neural network model according to an exemplary embodiment of the present disclosure.

FIG. 10 is a flowchart of a method for acquiring a recommended composition for a picture according to an exemplary embodiment of the present disclosure.

FIG. 11 is an entire flowchart of an exemplary embodiment of the present disclosure.

FIG. 12 is a flowchart showing a method for detecting a main object according to an exemplary embodiment of the present disclosure.

FIGS. 13 and 14 are examples of a method of recommending a picture when a main object is a frame or painting according to an exemplary embodiment of the present disclosure.

FIG. 15 is an example of a method for determining a main object when there are a plurality of objects according to an exemplary embodiment of the present disclosure.

FIGS. 16 and 17 are examples of a method for determining a main object based on a pre-registered person's information according to an exemplary embodiment of the present disclosure.

FIG. 18 is an example of a method for selecting and editing a recommended image according to an exemplary embodiment of the present disclosure.

DESCRIPTION OF EXEMPLARY EMBODIMENTS

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

Hereinafter, 5G communication (5th generation mobile communication) required by an apparatus requiring AI processed information and/or an AI processor will be described through paragraphs A through G.

A. Example of Block Diagram of UE and 5G Network

FIG. 2 is a block diagram of a wireless communication system to which methods proposed in the disclosure are applicable.

Referring to FIG. 2, a device (autonomous device) including an autonomous module is defined as a first communication device (910 of FIG. 2), and a processor 911 can perform detailed autonomous operations.

A 5G network including another vehicle communicating with the autonomous device is defined as a second communication device (920 of FIG. 2), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 4 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 4, the autonomous vehicle performs an initial access procedure and a random access procedure with the 5G network prior to step S1 of FIG. 4 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 5 is a block diagram illustrating a mobile terminal related to the present disclosure. FIGS. 6 and 7 are conceptual views of a mobile terminal related to the present disclosure when viewed from different directions Referring to FIGS. 5, 6 and 7, a mobile terminal MP may include a wireless communication unit 110, an input unit 120, a sensing unit 140, an output unit 150, an interface unit 160, a memory 170, a controller 180, and a power supply unit 190, and the like. It is understood that all the components illustrated in FIG. 5 is not requirements to implement the mobile terminal, and that more or fewer components may be alternatively implemented.

More specifically, the wireless communication unit 110 may include one or more modules which permit wireless communications between the mobile terminal MP and a wireless communication system, between the mobile terminal MP and another mobile terminal MP, or between the mobile terminal MP and an external server. Further, the wireless communication unit 110 may include one or more modules which connect the mobile terminal MP to one or more 5G networks.

The wireless communication unit 110 may include at least one of a broadcast receiving module 111, a mobile communication module 112, a wireless Internet module 113, a short-range communication module 114, or a location information module 115.

The input unit 120 may include a camera 121 which is one type of an image input unit for inputting an image signal, a microphone 122 which is one type of an audio input unit for inputting an audio signal, and a user input unit 123 (e.g., touch key, push key, etc.) for allowing a user to input information. Audio data or image data obtained by the input unit 120 may be analyzed and processed by user control commands.

The sensing unit 140 may include one or more sensors for sensing at least one of internal information of the mobile terminal, information about a surrounding environment of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., camera 121), the microphone 122, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The mobile terminal disclosed in the present specification may be configured to combine and utilize information obtained from two or more sensors of the sensing unit 140.

The output unit 150 may be configured to output various types of information, such as audio, video, tactile output, and the like. The output unit 150 may include at least one of a display unit 151, an audio output unit 152, a haptic module 153, or an optical output unit 154. The display unit 151 may have an inter-layered structure or an integrated structure with a touch sensor to implement a touch screen. The touch screen may provide an output interface between the mobile terminal MP and the user, as well as function as the user input unit 123 which provides an input interface between the mobile terminal MP and the user.

The interface unit 160 serves as an interface with various types of external devices that can be coupled to the mobile terminal MP. The interface unit 160 may include at least one of wired/wireless headset ports, external power supply ports, wired/wireless data ports, memory card ports, ports for connecting a device having an identification module, audio input/output (I/O) ports, video I/O ports, or earphone ports. The mobile terminal MP may perform assorted control functions associated with a connected external device, in response to the external device being connected to the interface unit 160.

The memory 170 stores data to support various functions of the mobile terminal MP. For instance, the memory 170 may be configured to store multiple application programs or applications executed in the mobile terminal MP, data or instructions for operations of the mobile terminal MP, and the like. At least some of these application programs may be downloaded from an external server via wireless communication. Other application programs may be installed within the mobile terminal MP at time of manufacturing or shipping, which is typically the case for basic functions (e.g., receiving a call, placing a call, receiving a message, sending a message, and the like) of the mobile terminal MP. The application programs may be stored in the memory 170, installed in the mobile terminal MP, and executed by the controller 180 to perform an operation (or function) for the mobile terminal MP.

The controller 180 typically functions to control overall operation of the mobile terminal MP, in addition to the operations associated with the application programs. The controller 180 may provide or process suitable information or functions appropriate for the user by processing signals, data, information and the like, which are input or output by the components mentioned above, or activating application programs stored in the memory 170.

The controller 180 may control at least some of the components illustrated in FIG. 5 in order to execute an application program that have been stored in the memory 170. In addition, the controller 180 may combine and operate at least two of the components included in the mobile terminal MP for the execution of the application program.

The power supply unit 190 is configured to receive external power or provide internal power and supply power to the respective components included in the mobile terminal MP under the control of the controller 180. The power supply unit 190 may include a battery, and the battery may be configured to be embedded in the device body, or configured to be detachable from the device body.

At least some of the above components may be combined with one another and operate, in order to implement an operation, a control, or a control method of a mobile terminal according to various embodiments described below. Further, the operation, the control, or the control method of the mobile terminal according to various embodiments may be implemented on the mobile terminal by an activation of at least one application program stored in the memory 170.

Referring to FIGS. 6 and 7, the mobile terminal MP includes a bar-shaped terminal body. However, the present disclosure is not limited thereto and may implement the mobile terminal MP in any of a variety of different configurations. Examples of such configurations include watch-type, clip-type, glasses-type, or folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, the terminal body may be understood as a concept of referring to the mobile terminal MP by considering the mobile terminal as at least one aggregate.

The mobile terminal MP includes a case (e.g., frame, housing, cover, etc.) forming an appearance of the terminal. As illustrated, the mobile terminal MP may include a front case 101 and a rear case 102. Various electronic components are incorporated in an inner space formed by coupling the front case 101 and the rear case 102. At least one middle case may be additionally positioned between the front case 101 and the rear case 102.

The display unit 151 may be located on a front surface of the terminal body to output information. As illustrated, a window 151a of the display unit 151 may be mounted on the front case 101 to form the front surface of the terminal body together with the front case 101.

In some embodiments, electronic components may also be mounted on the rear case 102. Examples of such electronic components mounted on the rear case 102 include a detachable battery, an identification module, a memory card, and the like. In this case, a rear cover 103 covering the electronic components may be detachably coupled to the rear case 102. Therefore, when the rear cover 103 is detached from the rear case 102, the electronic components mounted on the rear case 102 are externally exposed.

As illustrated, when the rear cover 103 is coupled to the rear case 102, a portion of a side surface of the rear case 102 may be exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, and 103 may be formed by injection-molding a synthetic resin or may be formed of a metal, for example, stainless steel (STS), aluminum (Al), titanium (Ti), or the like.

As an alternative to the example in which the plurality of cases form an inner space for accommodating the various electronic components, the mobile terminal MP may be configured such that one case forms the inner space. In this example, a mobile terminal MP having a uni-body is formed in such a manner that synthetic resin or metal extends from a side surface to a rear surface.

The mobile terminal MP may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103 to hermetically seal an inner space when those cases are coupled.

The mobile terminal MP may include the display unit 151, first and second audio output units 152a and 152b, the proximity sensor 141, the illumination sensor 142, the optical output module 154, first and second cameras 121a and 121b, first to third manipulation units 123a, 123b, and 123c, the microphone 122, the interface unit 160, an earphone jack 130, and the like.

Hereinafter, as illustrated in FIGS. 6 and 7, as an example, the mobile terminal MP is shown configured such that the display unit 151, the first audio output unit 152a, the proximity sensor 141, the illumination sensor 142, the optical output module 154, the first camera 121a, and the first manipulation unit 123a are disposed on the front surface of the terminal body, the second manipulation unit 123b, the microphone 122, the earphone jack 130, and the interface unit 160 are disposed on the side surface of the terminal body, and the second audio output unit 152b, the third manipulation unit 123c, and the second camera 121b are disposed on the rear surface of the terminal body.

However, these components are not limited to these arrangements. In some embodiments, some components may be excluded or replaced, or may be disposed on other surface. For example, the first manipulation unit 123a may not be disposed on the front surface of the terminal body, and the second audio output unit 152b may be disposed on the side surface of the terminal body not the rear surface of the terminal body.

The display unit 151 displays (outputs) information processed in the mobile terminal MP. For example, the display unit 151 may display execution screen information of an application program running in the mobile terminal MP, or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED) display, a flexible display, a three-dimensional (3D) display, or an e-ink display.

The display unit 151 may be implemented using two or more display units according to the implementation type of the mobile terminal MP. In this instance, a plurality of the display units may be disposed on one surface of the mobile terminal MP to be either spaced apart from each other or integrated, or the display units may be respectively disposed on different surfaces of the mobile terminal MP.

The display unit 151 may also include a touch sensor which senses a touch input received at the display unit 151 in order to receive a control command using a touching manner. If a touch is input to the display unit 151, the touch sensor may be configured to sense the touch, and the controller 180 may be configured to generate a control command corresponding to the touch. The content which is input in the touching manner may be a text or numerical value, or a menu item which can be indicated or designated in various modes.

The touch sensor may be formed in a film type having a touch pattern and disposed between the window 151a and a display (not shown) on a rear surface of the window 151a, or may be a metal wire which is patterned directly on the rear surface of the window 151a. Alternatively, the touch sensor may be integrally formed with the display. For example, the touch sensor may be disposed on a substrate of the display or within the display.

As described above, the display unit 151 may also form a touch screen together with the touch sensor. In this case, the touch screen may serve as the user input unit 123 (see FIG. 5). In some cases, the touch screen may replace at least a part of function of the first manipulation unit 123a.

The first audio output module 152a may be implemented as a receiver which transmits a call sound to user's ears, and the second audio output module 152b may be implemented in the form of a loud speaker to output various alarm sounds or multimedia reproduction sounds.

The window 151a of the display unit 151 may include an audio hole which permits audio generated by the first audio output module 152a to pass. However, the present disclosure is not limited thereto, and one alternative is to allow audio to be released along an assembly gap between structural bodies (for example, a gap between the window 151a and the front case 101). In this case, a hole independently formed to output audio sounds may be invisible or is otherwise hidden in terms of appearance, thereby further simplifying the appearance and manufacturing of the mobile terminal MP.

The optical output unit 154 is configured to output light for indicating that an event has occurred. Examples of the events include a message reception, a call signal reception, a missed call, an alarm, a schedule notice, an email reception, information reception through an application, and the like. When a user has checked a generated event, the controller 180 may control the optical output unit 154 to stop the light output.

The first camera 121a processes image frames of as a still image or a moving image obtained by an image sensor in a capture mode or a video call mode. The processed image frames may then be displayed on the display unit 151 or stored in the memory 170.

The first to third manipulation units 123a, 123b and 123b are examples of the user input unit 123, which is manipulated by a user to provide an input to the mobile terminal MP, and may also be referred commonly to as a manipulating portion. The first to third manipulation units 123a, 123b and 123b may employ any tactile method that allows the user to perform manipulation, such as touch, push, scroll, or the like. The first and second manipulation units 123a and 123b may also employ any non-tactile method that allows the user to perform manipulation such as proximity touch, hovering touch, or the like. The third manipulation unit 123c includes a finger scan sensor and can obtain user's fingerprint. The obtained fingerprint may be provided to the controller 180.

This figure illustrates the first manipulation unit 123a as a touch key, but the present disclosure is not limited thereto. For example, possible alternatives of the first manipulation unit 123a include a mechanical key, a push key, a touch key, and combinations thereof.

Input received at the first and second manipulation units 123*a* and 123*b* may be set in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output unit 152*a* or 152*b*, to switch to a touch recognition mode of the display unit 151, or the like.

As another example of the user input unit 123, the third manipulation unit 123*c* may be located on the rear surface of the terminal body. The third manipulation unit 123*c* may be manipulated by a user to provide input to the mobile terminal MP. The input may be set in a variety ways.

For example, the third manipulation unit 123*c* may be used by the user to provide an input for power on/off, start, end, scroll, control volume level being output from the first and second audio output units 152*a* and 152*b*, switch to a touch recognition mode of the display unit 151, fingerprint information acquisition, and the like. The rear input unit may be configured to permit a touch input, a push input, or combinations thereof.

The rear input unit may be located to overlap the display unit 151 of the front side in a thickness direction of the terminal body. As an example, the rear input unit may be located on an upper end portion of the rear side of the terminal body such that the user can easily manipulate it using a forefinger when the user grabs the terminal body with one hand. However, the present disclosure is not limited thereto. Alternatively, a position of the rear input unit may be changed.

If the rear input unit is positioned on the rear surface of the terminal body as described above, a new type of user interface using the rear input unit can be implemented. If the first manipulation unit 123*a* is omitted from the front surface of the terminal body by replacing at least some functions of the first manipulation unit 123*a* on the front surface of the terminal body by the touch screen or the rear input unit described above, the display unit 151 can have a larger screen.

As a further alternative, the mobile terminal MP may include a finger scan sensor which scans a user's fingerprint. The controller 180 can use fingerprint information sensed by the finger scan sensor as an authentication procedure. The finger scan sensor may also be embedded in the display unit 151 or the user input unit 123.

The microphone 122 is configured to receive user's voice, other sounds, and the like. The microphone 122 may be implemented using a plurality of microphones and configured to receive stereo sounds.

The interface unit 160 serves as a path allowing the mobile terminal MP to interface with external devices. For example, the interface unit 160 may include at least one of a connection terminal for connecting to another device (e.g., an earphone, an external speaker, etc.), a port for short-range communication (e.g., an infrared data association (IrDA) port, a Bluetooth port, a wireless LAN port, etc.), or a power supply terminal for supplying power to the mobile terminal MP. The interface unit 160 may be implemented in the form of a socket for accommodating an external card, such as subscriber identification module (SIM), user identity module (UIM), or a memory card for information storage.

The second camera 121*b* may be located at the rear surface of the terminal body. In this instance, the second camera 121*b* has an image capturing direction that is substantially opposite to an image capturing direction of the first camera unit 121*a*.

The second camera 121*b* may include a plurality of lenses arranged along at least one line. The plurality of lenses may also be arranged in a matrix form. The cameras may be referred to as an "array camera." When the second camera 121*b* is implemented as an array camera, the second camera 121*b* can take images using the plurality of lenses in various manners and thus can obtain the images with better quality.

A flash 124 may be positioned adjacent to the second camera 121*b*. When a subject is taken with the second camera 121*b*, the flash 124 illuminates the subject.

The second audio output module 152*b* may be additionally located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be embedded in the terminal body or formed at the case. For example, the antenna which forms a part of the broadcast receiving module 111 (see FIG. 5) may be configured to be retractable into the terminal body. Alternatively, the antenna may be formed in a film type and attached to an inner surface of the rear cover 103, or may be replaced by a case including a conductive material.

The power supply unit 190 (see FIG. 5) for supplying power to the mobile terminal MP is located at the terminal body. The power supply unit 190 may include a battery 191 that is embedded in the terminal body and is detachably configured to the outside of the terminal body.

The battery 191 may be configured to receive power via a power cable connected to the interface unit 160. The battery 191 may also be configured to be charged using a wireless charger. The wireless charging may be implemented by a magnetic induction method or a resonance method (electromagnetic resonance method).

This figure illustrates that the rear cover 103 is configured to couple to the rear case 102 for covering the battery 191 to thereby prevent the separation of the battery 191 and to protect the battery 191 from an external impact or foreign material, by way of example. When the battery 191 is detachable from the terminal body, the rear cover 103 may be detachably coupled to the rear case 102.

An accessory for protecting an appearance or assisting or extending the functions of the mobile terminal MP may be additionally provided to the mobile terminal MR. Examples of the accessory may include a cover or a pouch for covering or accommodating at least one surface of the mobile terminal MR. The cover or the pouch may be configured to cooperate with the display unit 151 and extend the function of the mobile terminal MR. Another example of the accessory may include a touch pen for assisting or extending a touch input to a touch screen.

FIG. 8 is a block diagram of an AI device according to an embodiment of the present disclosure.

Referring to FIG. 8, an AI device 20 may include an electronic device including an AI module capable of performing AI processing, or a server including the AI module, or the like. Further, the AI device 20 may be included as at least some components of an intelligent electronic device MP illustrated in FIG. 5 and perform together at least a part of the AI processing. The intelligent electronic device MP may be referred to as a mobile terminal, a portable device, a smart terminal, and a smart device.

The AI processing may include all operations related to the control of the intelligent electronic device MP illustrated in FIG. 5. For example, the intelligent electronic device MP can perform AI processing on sensing data or acquired data to perform processing/decision operation and a control signal generation operation. For example, the intelligent electronic device MP can perform AI processing on data received through a communication unit to perform the control of the intelligent electronic device.

The AI device 20 may be a client device directly using a result of AI processing, or a device in a cloud environment providing the result of AI processing to another device.

The AI device 20 may include an AI processor 21, a memory 25, and/or a communication unit 27.

The AI device 20 is a computing device capable of learning a neutral network and may be implemented as various electronic devices including a server, a desktop PC, a notebook PC, a tablet PC, and the like.

The AI processor 21 may learn a neural network using a program stored in the memory 25. In particular, the AI processor 21 may learn a neural network for recognizing data related to the mobile terminal MP. Here, the neural network for recognizing the data related to the mobile terminal MP may be designed to emulate a human brain structure on a computer and may include a plurality of network nodes with weight that emulate neurons in a human neural network. The plurality of network nodes may send and receive data according to each connection relationship so that neurons emulate the synaptic activity of neurons sending and receiving signals through synapses. Here, the neural network may include a deep learning model, which has evolved from a neural network model. In the deep learning model, the plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present disclosure.

The AI processor 21 may further include a data learning unit 22 for learning a neural network for data classification/recognition. The data learning unit 22 may learn criteria as to which learning data is used to decide the data classification/recognition and how data is classified and recognized using learning data. The data learning unit 22 may learn a deep learning model by acquiring learning data to be used in learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, data and/or sample data of the mobile terminal MP to be input to a neural network model.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process obtained data so that the obtained data can be used in learning for deciding the situation. For example, the learning data pre-processing unit may process obtained learning data into a predetermined format so that the model learning unit 24 can use the obtained learning data in learning for recognizing images.

Moreover, the learning data selection unit may select data required for learning among learning data obtained by the learning data acquisition unit 23 or learning data pre-processed by the pre-processing unit. The selected learning data may be provided to the model learning unit 24. For example, the learning data selection unit may detect a specific area in an image obtained with a camera of the intelligent electronic device MP to select only data for objects included in the specific area as learning data.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may transmit, to an external electronic device, a result of the AI processing by the AI processor 21. For example, the external electronic device may include a Bluetooth device, an autonomous vehicle, a robot, a drone, an AR device, a portable device, a home appliance, and the like.

Although the AI device 20 illustrated in FIG. 8 was functionally separately described into the AI processor 21, the memory 25, the communication unit 27, etc., the above components may be integrated into one module and referred to as an AI module.

FIG. 9 is a view showing a training data set for a pre-trained artificial neural network model according to an exemplary embodiment of the present disclosure.

Referring to FIG. 9, a training data set TS of the present disclosure may include first photographic composition data obtained from a preliminary image acquired by the camera 121 and second photographic composition data obtained from pre-collected recommended images. In this case, training an artificial neural network may mean that a mathematical model capable of making an optimal decision is created by connecting neurons in the artificial neural network while properly changing the weights based on data.

The preliminary image refers to an image captured by the camera 121, and may include a preview image which is temporarily stored when captured. The preliminary image is temporarily stored in the memory 170 of the mobile terminal MP, and deleted after a certain period of time. Then again, the user may preset the preliminary image to be permanently stored, or may keep the preliminary image in the memory 170 for permanent storage via touch input after capturing it.

The recommended images may include a professional photographer's pictures collected by crawling the web. However, if the recommended images are limited to the professional photographer's pictures, there may be glitches such as improper editing of a captured image unless the photographer's pictures suit the user's preferences. Thus, the user's history of selecting recommended images and the user's image editing history based on the recommended images may be added to the training data set TS to continue training a composition recommendation model AN. By re-training the composition recommendation model AN, it can be personally adapted.

The recommendation images may include photographic data uploaded on SNSs (social network services). For example, pictures uploaded on the user's SNS account are highly likely to be deemed preferred by the user, and the composition recommendation model AN may be trained based on the pictures uploaded on the SNS account, thereby performing a function of recommending a composition that suits the user's preferences.

In an exemplary embodiment of the present disclosure, photographic composition data is not limited only to data about the composition of objects included in an image, but may include a number of elements related to photography composition. Specifically, the photographic composition data may include information on the user's location and time obtained through the mobile terminal MP. Moreover, the photographic composition data may include seasonal information at the time of capturing which is obtained by analyzing contrast, shadows, the position of the sun, etc. Furthermore, the photographic composition data may include surrounding temperature information at the time of capturing which is obtained through a sensor part of the mobile terminal MP.

The user may set a photographer in advance through an application on the mobile terminal MP. For example, only pictures from Photographer A that suit the user's preferences may be collected from among those from Photographers A, B, and C and set to train the composition recommendation model AN. This offers the advantage that the photographic compositions of Photographers B and C which are not desired by the user are not used for recommending a composition for a captured image.

FIG. 10 is a flowchart of a method for acquiring a recommended composition for a picture according to an exemplary embodiment of the present disclosure.

Referring to FIG. 10, the mobile terminal MP may acquire an image by the camera 121 (S1010). The mobile terminal MP may adjust the brightness, saturation, illuminance, etc. of a picture in the step of acquiring an image. Also, the mobile terminal MP may adjust the camera 121's focus on an object to be shot by using an autofocus function or a focus function via touch input from the user. A first image acquired by the camera 121 may be referred to as a preliminary image. The preliminary image may be an image the user can see through a viewfinder or screen in advance before taking a photograph. The mobile terminal MP may store an acquired image in the mobile terminal MP or send it to an external server.

The AI processor 21 may apply the acquired preliminary image to a pre-trained composition recommendation model AN (S1020). In this case, the AI device 20 comprising the AI processor 21 may be provided in the mobile terminal MP or in an external server. The composition recommendation model AN may be pre-trained on the training data set TS described above with reference to FIG. 10 and stored in the memory 25. Specifically, the composition recommendation model AN may be an artificial neural network model that is supervised model and trained by setting up photographic composition data for a preliminary image as input data and setting up photographic composition data for a recommended image as a label.

The AI processor 21 may create a recommended composition based on an output from the composition recommendation model AN (S1030). Specifically, the AI processor 21 may distinguish humans and objects, focusing on the center region of the image. Also, the AI processor 21 may determine a recommended photographic composition by using information about an identified object and information related to light around the object.

This way, it is possible to obtain data about the composition of a preliminary image and to determine data about the composition of a recommended image whose degree of similarity to the data about the composition of the preliminary image is equal to or above a threshold. Based on the determined data about the composition of the recommended image, the AI processor 21 may create a recommended composition.

In one exemplary embodiment of the present disclosure, the AI processor 21 may create a recommended photographic composition by identifying photographic compositions and objects from images photographed by professionals and comparing the identified photographic compositions and objects with metadata and photography environment information. In this case, the composition recommendation model AN for deriving optimum photographic results may be updated with increasing amounts of metadata and photographic environment information.

The AI processor 21 may edit the preliminary image based on the created recommended composition (S1040). In this case, the AI processor 21 may delete part of the preliminary image or change the size of the preliminary image. Also, pixel information for the image may be moved or changed to adapt to the photographic composition of the recommended image. In this instance, any distortion of the preliminary image due to a change to the pixel information may be compensated for based on pixel information for the surrounding area of one pixel, so as to make the preliminary image approximate the recommended image.

FIG. 11 is an entire flowchart of an exemplary embodiment of the present disclosure. Redundancies in the foregoing description with reference to FIG. 10 will be omitted, and the following description will focus on the differences.

Referring to FIG. 11, first of all, the mobile terminal MP may acquire an image by the camera 121 (S1110).

The AI processor 21 may identify a main object to be shot (S1115).

The AI processor 21 may apply a preliminary image to a pre-trained composition recommendation model AN (S1120).

The AI processor 21 may create a recommended composition based on an output from the composition recommendation model AN (S1125).

The AI processor 21 may edit the preliminary image based on the recommended composition and display it through the display 151 of the mobile terminal MP (S1130).

If the user edits the edited image at their own discretion, the AI processor 21 may extract feature information on changes in the composition of the image before and after the editing (S1135 and S1145). When the edited preliminary image reflecting the recommended composition is displayed through the display 151, the user may correct the image through an editing tool provided on the user interface 160. For example, the preliminary image may not suit the user's preferences even if it is corrected based on the recommended composition, and the user may return to the preliminary image of before the correction and then edit the image at their own discretion.

In this case, the AI processor 21 may extract feature information on changes in composition by comparing information about changes to the image before and after the editing. For example, while the display 151 may present the recommended composition as excluding a first object from a final image, the user's intention may be seen as preferring the first object to be included in the image if the user restores the first object and excludes a second object. This way, it is possible to extract feature information on changes in composition based on information such as deletions, restorations, and changes of objects and changes in the positions of objects on the image. Based on such feature information, the composition recommendation model AN may be re-trained, thereby creating an artificial neural network model further optimized for the user.

If the image is corrected by the user, the AI processor 21 may store the corrected image as the final image. On the other hand, if the image is not corrected by the user, the AI processor 21 may create the final image by editing the image based on the recommended composition (S1140).

If the image is edited by the user, the AI processor 21 may store the user's editing history in a training data set TS (S1150). If the image is not edited by the user, the AI processor 21 may store the user's selection history in the training data set TS, showing that the user has stored the image without editing it.

FIG. 12 is a flowchart showing a method for detecting a main object according to an exemplary embodiment of the present disclosure.

Referring to FIG. 12, first of all, the AI processor 21 may determine whether or not a person included in a preliminary image is a person pre-registered on an external server or the mobile terminal MP (S1210). According to an exemplary embodiment of the present disclosure, the AI module 20 may comprise a face recognition module. The face recognition module may extract feature points from the face of a person in an image and identify the person who matches the feature points. The AI processor 21 may perform a face recognition function based on information related to face recognition of a person pre-stored in a server external to the mobile terminal MP or information related to face recognition stored in the mobile terminal MP.

If a pre-registered person is contained in the preliminary image, the AI processor 21 may recommend a composition in which the pre-registered person is set as a main object (S1245). According to an exemplary embodiment of the present disclosure, the user may pre-register image information of a specific person through the mobile terminal MP. For example, image information of a person corresponding to contact list information may be stored. The contact list information may comprise job title, job position, family members, etc. Moreover, the AI processor 21 may determine the user's level of intimacy based on the contact list information such as job title, job position, family members, etc.

If a person who is rated as high priority based on the level of intimacy is included in the preliminary image, the AI processor 21 may recommend a photographic composition, with a focus on the high-priority person. For example, if a plurality of persons and objects are included in the preliminary image and a person registered as a mother is standing within a specific distance from the center, the AI processor 21 may recommend a composition in which the mother is positioned as the center of the image based on the mother's face recognition information. Such a recommendation method allows for identifying the main object more easily and accurately recommending a corresponding photographic composition.

The AI processor 21 may determine whether there is a focus on a particular object or not (S1215). At least one object may be included in the preliminary image, and the AI processor 21 may distribute focus evenly on the entire image or bring a particular object into focus or other objects out of focus. If a particular object is brought into focus, the user may be seen as intending to capture the particular object, and a composition with the particular object set as the main object may be recommended to suit the user's intention. Focus methods may include autofocus (AF) which focuses automatically through a controller of the camera 121 and manual focus (MF) which focuses through the user's manual operation.

The AI processor 21 may obtain focusing information (S1220).

The AI processor 21 may obtain information on control by the camera 121 and information on control through the user's manual operation. For example, when autofocus works, information about object identification and information about resulting changes in focus may be obtained. In another example, when manual focus works, touch input information and information about resulting changes in focus may be obtained as the information on control through the user's manual operation.

The AI processor 21 may identify the type of a target to be focused on (S1225 and S1230). The user may identify a target and its type based on the obtained focusing information. The target to be focused on may include a person, object, animal, etc. Also, the AI processor 21 may recommend different compositions for different focusing targets.

The AI processor 21 may recommend a composition in which the target to be focused on is set as the main object (S1255 and S1260).

If the main object is not clear, the AI processor 21 may display a main object selection message through the display 151 (S1235). If there are a plurality of objects in the preliminary image, and the main object is deemed unclear despite the analysis of movement information of a particular object by comparing it to the size and position of a particular object away from the center region of the image and comparing the previous and following frames, the AI processor 21 may display a main object selection request message through the display 151 to see what the user intends to select. In this case, although not shown, the AI processor 21 may send out a voice asking to select the main object through a speaker.

Upon detecting a touch input from the user in response to the main object selection message, the AI processor 21 may recommend a composition in which an object in the touch input area is set as the main object (S1240).

FIGS. 13 and 14 are examples of a method of recommending a picture when a main object is a frame or painting according to an exemplary embodiment of the present disclosure.

Referring to FIG. 13, a preliminary image in FIG. 13 contains one man, one woman, and a frame with a painting. In this case, the image may be deemed highly important compared to the man and woman with their backs turned. The AI processor 21 may view the painting in the frame closest from the center as a main object and view the two persons as unnecessary in terms of composition. Accordingly, the AI processor 21 may create an image containing only the painting, excluding the persons on either side of the frame.

Referring to FIG. 14, a preliminary image in FIG. 14 contains one man with his back turned and three frames. Each frame contains a different painting, and the AI processor 21 may recommend a different image for each frame or one image for the three frames.

FIG. 15 is an example of a method for determining a main object when there are a plurality of objects according to an exemplary embodiment of the present disclosure.

Referring to FIG. 15, a preliminary image in FIG. 15 contains a plurality of objects. The AI processor 21 may analyze the gaze and behavior pattern of a person positioned at the center among the plurality of objects shown in FIG. 15 and view the woman positioned at the center as a main object according to analysis results.

FIGS. 16 and 17 are examples of a method for determining a main object based on a pre-registered person's information according to an exemplary embodiment of the present disclosure.

Referring to FIG. 16, the preliminary image contains a man on the right side and a woman on the left side. The man on the right side is a person pre-registered on an external server or the user's mobile terminal MP. The AI processor 21 may identify the pre-registered man as a main object, and edit the preliminary image in such a way that the main object is positioned at the center of the composition of a picture. Also, the AI processor 21 may edit the preliminary image to exclude other parts of the image (i.e., the face of the woman on the left side) that obstruct the main object in the composition of a picture.

Referring to FIG. 17, a preliminary image contains an airport in the background, a main on the left side, and a woman on the right side. The main on the left side is a is a person pre-registered on an external server or the user's mobile terminal MR. The AI processor 21 may identify the pre-registered man as a main object, and edit the preliminary image in such a way that the main object is positioned at the center of the composition of a picture.

FIG. 18 is an example of a method for selecting and editing a recommended image according to an exemplary embodiment of the present disclosure. Specifically, (a) of FIG. 18 is a captured preliminary image, (b) of FIG. 18 is an image corrected based on a recommended photographic composition, (c) of FIG. 18 shows a process of returning to the preliminary image of before the correction and editing the image via touch input from the user, and (d) of FIG. 18 is a view showing an image corrected by the user.

Referring to (a) to (d) of FIG. 18, the preliminary image contains a person positioned on the left side of the preliminary image and a person positioned at the center. The AI module 20 corrects the preliminary image in such a way as to contain both the two people by using a composition recommendation model AN (see (b) of FIG. 18). However, unless the user intends to include the person on the left side in the preliminary image, the user may return to the preliminary image of before the correction and correct it by deleting a particular area via touch input (see (c) of FIG. 18). The correction is made in such a way that the preliminary image contains the person positioned at the center (see (d) of FIG. 18).

A history of such corrections may be stored in the user's mobile terminal or an external server, and offers the advantage of helping with personal adaptation.

The present disclosure described above may be implemented in computer-readable codes in a computer readable recording medium, and the computer readable recording medium may include all kinds of recording devices for storing data that is readable by a computer system. Examples of the computer readable recording medium include HDD (Hard Disk Drive), SSD (Solid State Disk), SDD (Silicon Disk Drive), ROM, RAM, CD-ROM, magnetic tape, floppy disk, optical data storage device, and the like, and may be implemented in the form of carrier waves (e.g., transmission through the internet). Accordingly, the foregoing detailed description should not be interpreted as restrictive in all aspects, and should be considered as illustrative. The scope of the present disclosure should be determined by rational interpretation of the appended claims, and all changes within the equivalent scope of the present disclosure are included in the scope of the present disclosure.

What is claimed is:

1. A method for editing an image based on artificial intelligence, the method comprising:
   acquiring a preliminary image by a camera;
   applying the preliminary image to a pre-trained composition recommendation model;
   creating a recommended photographic composition based on an output from the composition recommendation model;
   correcting the preliminary image based on the recommended photographic composition, wherein the composition recommendation model is an artificial neural network model that is trained by setting up first photographic composition data and second photographic composition data as a training data set, the first photographic composition data being extracted from the preliminary image, and the second photographic composition data being extracted from the from a recommended image;

obtaining a user's history of selecting recommended images and the user's image editing history;

updating the training data set based on the user's history of selecting recommended images and the user's image editing history; and training the composition recommendation model based on the updated training data set.

2. The method of claim 1, wherein the recommended image is a professional photographer's photographic image.

3. The method of claim 1, further comprising:
identifying objects included in the preliminary image; and
obtaining photographic composition data based on positions of the identified objects.

4. The method of claim 3, wherein the photographic composition data comprises at least one among types of objects, a number of objects, and a main object.

5. The method of claim 4, further comprising determining the main object.

6. The method of claim 5, wherein the determining of the main object comprises identifying a person pre-registered on an artificial intelligence device,
wherein, if the pre-registered person exists, the pre-registered person is set as the main object.

7. The method of claim 5, wherein the determining of the main object comprises determining the main object based on a proportion of each of a plurality of objects included in the preliminary image.

8. The method of claim 5, wherein the determining of the main object comprises determining the main object based on the camera's focusing information.

9. The method of claim 1, further comprising, if there is at least one recommended image, displaying the recommended image on a display.

10. The method of claim 1, wherein the applying of the preliminary image to a pre-trained composition recommendation model further comprises:
transmitting the preliminary image to an external server connected to the artificial intelligence device to apply the same to a composition recommendation model stored in the external server, and receiving a recommended photographic composition created based on an output from the composition recommendation model stored in the external server.

11. An artificial intelligence device comprising:
a memory that stores a trained composition recommendation model and a training data set for the composition recommendation model;
a transceiver that communicates with an external server;
a camera that captures a preliminary image; and
a processor that applies the preliminary image to the composition recommendation model, creates a recommended photographic composition based on an output from the composition recommendation model, and corrects the preliminary image based on the recommended photographic composition,
wherein the composition recommendation model is an artificial neural network model that is trained by setting up first photographic composition data and second photographic composition data as a training data set,
wherein the first photographic composition data is extracted from the preliminary image, and the second photographic composition data is extracted from a recommended image, and
wherein the processor obtains a user's history of selecting recommended images and the user's image editing history, updates the training data set based on the user's history of selecting recommended images and the user's image editing history, and trains the composition recommendation model based on the updated training data set.

12. The artificial intelligence device of claim 11, wherein the processor identifies objects included in the preliminary image, and obtains photographic composition data based on positions of the identified objects.

13. The artificial intelligence device of claim 12, wherein the photographic composition data comprises at least one among types of objects, a number of objects, and a main object.

14. The artificial intelligence device of claim 13, wherein the processor determines the main object.

15. The artificial intelligence device of claim 14, wherein a person pre-registered on the artificial intelligence device is set as the main object.

16. The artificial intelligence device of claim 14, wherein the main object is determined based on a proportion of each of a plurality of objects included in the preliminary image.

* * * * *